United States Patent
Yang et al.

(10) Patent No.: US 9,521,428 B2
(45) Date of Patent: Dec. 13, 2016

(54) METHOD, DEVICE AND SYSTEM FOR RESIZING ORIGINAL DEPTH FRAME INTO RESIZED DEPTH FRAME

(71) Applicant: NATIONAL CHENG KUNG UNIVERSITY, Tainan (TW)

(72) Inventors: Jar-Ferr Yang, Tainan (TW); Hung-Ming Wang, Tainan (TW); Hsi-Chun Tseng, Zhongli (TW)

(73) Assignee: National Cheng Kung University, Tainan (TW)

( * ) Notice: Subject to any disclaimer, the term of this patent is extended or adjusted under 35 U.S.C. 154(b) by 155 days.

(21) Appl. No.: 14/504,901

(22) Filed: Oct. 2, 2014

(65) Prior Publication Data

US 2015/0092848 A1   Apr. 2, 2015

(30) Foreign Application Priority Data

Oct. 2, 2013   (TW) .............................. 102135703 A

(51) Int. Cl.

| | | |
|---|---|---|
| G06F 17/30 | (2006.01) | |
| G06K 9/00 | (2006.01) | |
| G06T 3/40 | (2006.01) | |
| H04N 13/00 | (2006.01) | |
| H04N 19/597 | (2014.01) | |
| H04N 19/132 | (2014.01) | |
| H04N 19/186 | (2014.01) | |
| H04N 19/182 | (2014.01) | |
| H04N 19/59 | (2014.01) | |

(52) U.S. Cl.
CPC ........... *H04N 19/597* (2014.11); *G06T 3/4023* (2013.01); *H04N 13/0029* (2013.01); *H04N 13/0048* (2013.01); *H04N 19/59* (2014.11); *H04N 2213/003* (2013.01); *H04N 2213/005* (2013.01)

(58) Field of Classification Search
None
See application file for complete search history.

(56) References Cited

U.S. PATENT DOCUMENTS

| | | | |
|---|---|---|---|
| 7,519,235 B1 * | 4/2009 | Georgiev | G06T 3/40 382/260 |
| 8,395,617 B2 * | 3/2013 | Kao | H04N 13/0029 345/419 |
| 2012/0044216 A1 * | 2/2012 | Furihata | G09G 3/3688 345/204 |
| 2013/0076739 A1 | 3/2013 | Cheng et al. | |
| 2014/0036033 A1 * | 2/2014 | Takahashi | H04N 19/00769 348/43 |

FOREIGN PATENT DOCUMENTS

| | | |
|---|---|---|
| CN | 102868899 A | 1/2013 |
| TW | 201315207 A | 4/2013 |
| TW | 201325200 A1 | 6/2013 |
| WO | WO2009/081335 A1 | 7/2009 |

* cited by examiner

*Primary Examiner* — Michelle Entezari
(74) *Attorney, Agent, or Firm* — Muncy, Geissler, Olds & Lowe, P.C.

(57) ABSTRACT

A method, a device and a system for resizing an original depth frame into a resized depth frame. The method for resizing an original depth frame into a resized depth frame includes the steps of: obtaining two sub-pixel values from at least two pixels of the original depth frame, respectively; and storing the two sub-pixel values into corresponding two sub-pixels of one pixel of the resized depth frame, respectively.

12 Claims, 9 Drawing Sheets

---

S01: obtaining two sub-pixel values from at least two pixels of the original depth frame, respectively S02: storing the two sub-pixel values into corresponding two sub-pixels of a pixel of the resized depth frame, respectively

|   | 1 | 2 | 3 | 4 | 5 | 6 | 7 | 8 | 9 |
|---|---|---|---|---|---|---|---|---|---|
| 1 | R (30) | G (30) | B (30) | R (29) | G (29) | B (29) | R (100) | G (100) | B (100) |
| 2 | R (31) | G (31) | B (31) | R (30) | G (30) | B (30) | R (102) | G (102) | B (102) |
| 3 | R (32) | G (32) | B (32) | R (33) | G (33) | B (33) | R (105) | G (105) | B (105) |
| 4 | R (34) | G (34) | B (34) | R (37) | G (37) | B (37) | R (103) | G (103) | B (103) |
| 5 | R (36) | G (36) | B (36) | R (39) | G (39) | B (39) | R (104) | G (104) | B (104) |
| 6 | R (35) | G (35) | B (35) | R (38) | G (38) | B (38) | R (106) | G (106) | B (106) |

FIG. 1 (Prior Art)

|   | 1 | 2 | 3 | 4 | 5 | 6 | 7 | 8 | 9 |
|---|---|---|---|---|---|---|---|---|---|
| 1 | R (195) | G (195) | B (195) | R (198) | G (198) | B (198) | R (200) | G (200) | B (200) |
| 2 | R (190) | G (190) | B (190) | R (197) | G (197) | B (197) | R (202) | G (202) | B (202) |
| 3 | R (187) | G (187) | B (187) | R (189) | G (189) | B (189) | R (205) | G (205) | B (205) |
| 4 | R (27) | G (27) | B (27) | R (30) | G (30) | B (30) | R (33) | G (33) | B (33) |
| 5 | R (26) | G (26) | B (26) | R (32) | G (32) | B (32) | R (34) | G (34) | B (34) |
| 6 | R (28) | G (28) | B (28) | R (31) | G (31) | B (31) | R (35) | G (35) | B (35) |

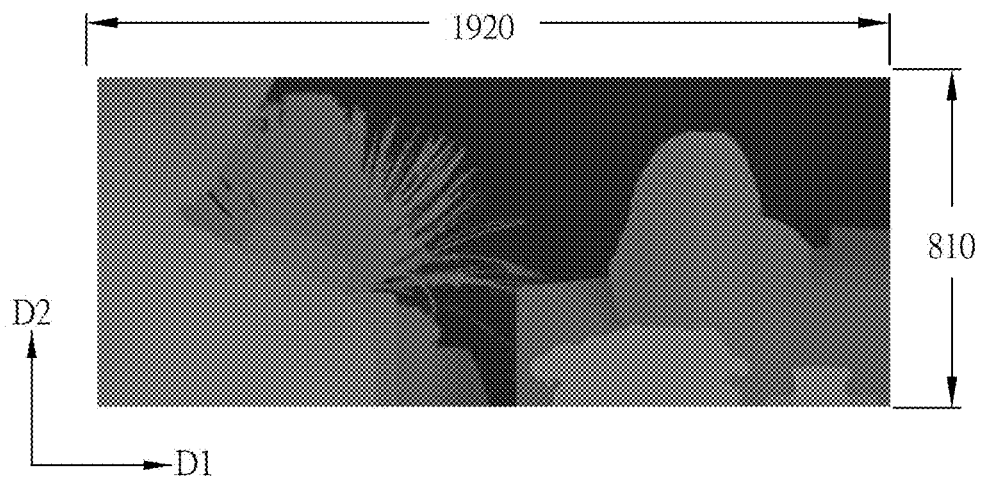
FIG. 6A
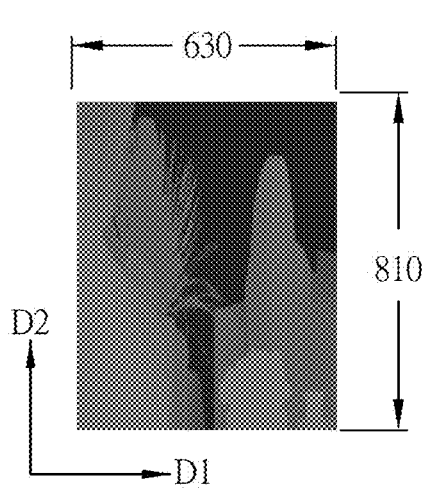 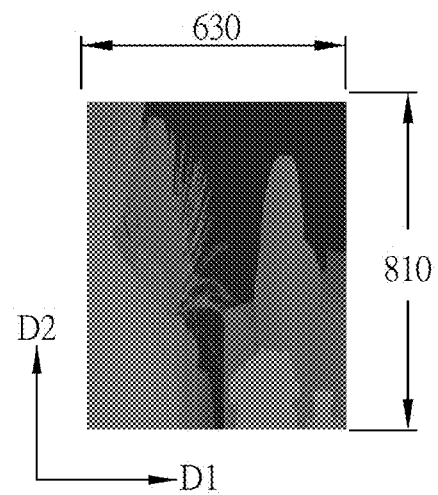
FIG. 6B    FIG. 6C

METHOD, DEVICE AND SYSTEM FOR RESIZING ORIGINAL DEPTH FRAME INTO RESIZED DEPTH FRAME

CROSS REFERENCE TO RELATED APPLICATIONS

This Non-provisional application claims priority under 35 U.S.C. §119(a) on Patent Application No(s). 102135703 filed in Taiwan, Republic of China on Oct. 2, 2013, the entire contents of which are hereby incorporated by reference.

BACKGROUND OF THE INVENTION

Field of Invention

The present invention relates to a method, a device and a system for resizing an original depth frame into a resized depth frame.

Related Art

As the progress of technologies, the performance and quality of electronic products have become the prior consideration of electronic product development. For example, the basic requirement for display devices is to provide a high-definition and more comfortable images. Except for the basic requirement, the manufacturer further develops the 3D display device for providing a new visual experience to the users.

In general, a 3D image generating system can analyze the original 2D image data (e.g. a color frame) so as to produce a depth frame corresponding to the color frame, and then transmit the color frame and the depth frame to a 3D display device of the user through the conventional transmission apparatus. After receiving the color frame and the depth frame, the 3D display device can calculate to generate two or more multi-view angle images for any naked-eye 3D display device or to generate a left-eye image and a right-eye image for a glasses-type 3D display device.

However, the conventional transmission technology never processes the color frame and the depth frame by data reduction or data compression before the transmission, which may result in the redundant data transmission and processing. FIG. 1 is a schematic diagram showing the transmitted pixel data structure of the depth frame in the original format (without further processing). Referring to FIG. 1, the original depth frame O is a gray-level frame, and each pixel of the corresponding color frame has three sub-pixels. Accordingly, each pixel of the original depth frame O also has three sub-pixels (red, green and blue sub-pixels (R, G, B)). In fact, since the original depth frame O is a gray-level frame, each of the sub-pixels has a corresponding sub-pixel value (gray-level value), and the sub-pixel values are all the same.

Therefore, it is desired to provide an effective frame data compression so as to reduce the loadings of the current transmission apparatus and bandwidth.

SUMMARY OF THE INVENTION

In view of the foregoing, an objective of the present invention is to provide an effective frame data compression method, device and system, which have the advantages of higher compression efficiency, smaller data volume and higher transmission efficiency for reducing the loadings of the current transmission apparatus and bandwidth.

To achieve the above objective, the present invention discloses a method for resizing an original depth frame into a resized depth frame. The method includes the steps of: obtaining two sub-pixel values from at least two pixels of the original depth frame, respectively; and storing the two sub-pixel values into corresponding two sub-pixels of a pixel of the resized depth frame, respectively.

To achieve the above objective, the present invention also discloses a device for resizing an original depth frame into a resized depth frame. The device includes a pixel retrieving unit and a pixel storing unit. The pixel retrieving unit obtains two sub-pixel values from at least two pixels of the original depth frame, respectively. The pixel storing unit stores the two sub-pixel values into corresponding two sub-pixels of a pixel of the resized depth frame, respectively.

To achieve the above objective, the present invention further discloses a system for resizing an original depth frame into a resized depth frame. The system includes a memory unit and a processing unit. The memory unit stores the original depth frame. The processing unit obtains two sub-pixel values from at least two pixels of the original depth frame, respectively, and stores the two sub-pixel values into corresponding two sub-pixels of a pixel of the resized depth frame, respectively.

In one embodiment, the original depth frame is a gray-level frame, and the sub-pixel values of each pixel of the gray-level frame are the same.

In one embodiment, each of the pixels of the original depth frame has three sub-pixels, and the sub-pixel values of the sub-pixels are the same.

In one embodiment, each of the pixels of the resized depth frame has three sub-pixels, and the step of storing the sub-pixel values is to correspondingly store the three sub-pixel values into three sub-pixels of one of the pixels of the resized depth frame.

In one embodiment, the size of the resized depth frame is ⅓ of the original depth frame along a column direction.

In one embodiment, the size of the resized depth frame is ⅓ of the original depth frame along a row direction.

As mentioned above, the method for resizing an original depth frame into a resized depth frame is to obtain two sub-pixel values from at least two pixels of the original depth frame, respectively, and to store the two sub-pixel values into corresponding two sub-pixels of a pixel of the resized depth frame, respectively. Accordingly, the data volume of the resized depth frame can be at least minimized to about ⅓ of the original depth frame, thereby providing an effective compression technology for depth frames. The method, device and system of the invention have the advantages of higher compression efficiency, smaller data volume and higher transmission efficiency, so that it can effectively reduce the loadings of the bandwidth of the current transmission apparatus.

BRIEF DESCRIPTION OF THE DRAWINGS

The invention will become more fully understood from the detailed description and accompanying drawings, which are given for illustration only, and thus are not limitative of the present invention, and wherein:

FIG. 1 is a schematic diagram showing the transmitted pixel data structure of the depth frame in the original format (without further processing);

FIG. 5A is a schematic diagram showing another original depth frame according to the preferred embodiment of the invention;

FIGS. 5B and 5C are schematic diagrams showing two resized depth frames, respectively, according to the preferred embodiment of the invention;

FIG. 6A is a schematic diagram showing the image of another original depth frame according to the preferred embodiment of the invention;

FIG. 6B is a schematic diagram showing the image of a resized depth frame (from the original depth frame of FIG. 6A) according to the preferred embodiment of the invention;

FIG. 6C is a schematic diagram showing the image of another resized depth frame (from the original depth frame of FIG. 6A) according to the preferred embodiment of the invention.

DETAILED DESCRIPTION OF THE INVENTION

The present invention will be apparent from the following detailed description, which proceeds with reference to the accompanying drawings, wherein the same references relate to the same elements.

Figure 2A:
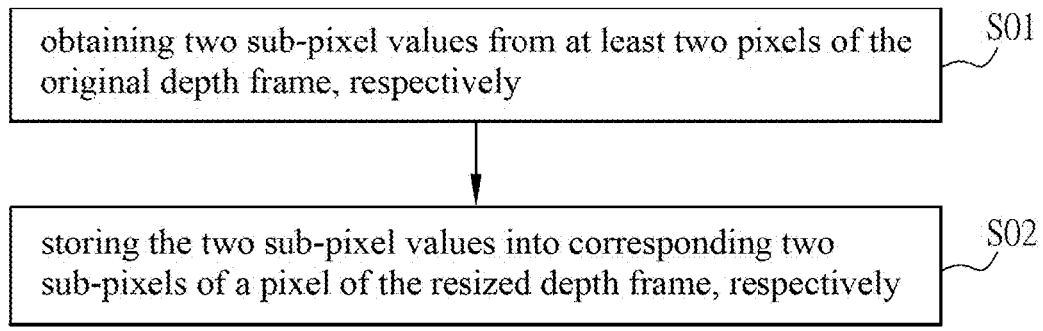
FIG. 2A is a flow chart of a method for resizing an original depth frame into a resized depth frame according to a preferred embodiment of the invention.
Figure 2B:
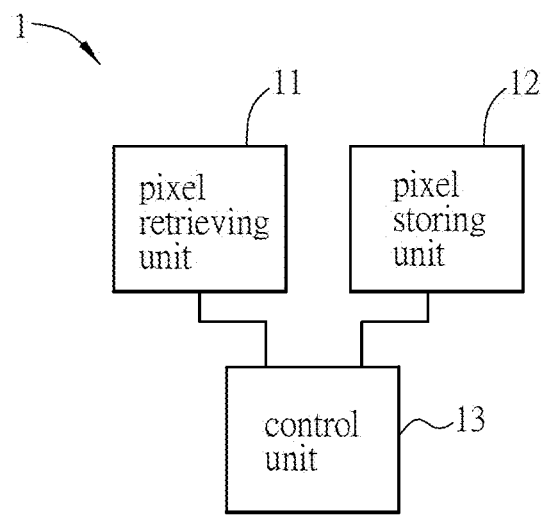
FIG. 2B is a functional block diagram of a device for resizing an original depth frame into a resized depth frame according to a preferred embodiment of the invention.

FIG. 2A is a flow chart of a method for resizing an original depth frame into a resized depth frame according to a preferred embodiment of the invention, and FIG. 2B is a functional block diagram of a device 1 for resizing an original depth frame into a resized depth frame according to a preferred embodiment of the invention.

Referring to FIG. 2A, the method for resizing an original depth frame into a resized depth frame of the embodiment includes the steps S01 to S02. The step S01 is to obtain two sub-pixel values from at least two pixels of the original depth frame, respectively. The step S02 is to store the two sub-pixel values into corresponding two sub-pixels of one pixel of the resized depth frame, respectively. In this case, the original depth frame is a gray-level frame obtained by a depth frame camera. Otherwise, the original depth frame can also be generated based on an original multi-view color frame (2D color image of multiple viewing angles, which is referred to an original color frame hereinafter). Accordingly, the original depth frame corresponds to the original color frame, and is a gray-level frame. In the step S01, the two pixels of the original depth frame are located on the same column or row of the original depth frame. The details will be discussed hereinafter.

With reference to FIG. 2B, the device 1 for resizing an original depth frame into a resized depth frame includes a pixel retrieving unit 11, a pixel storing unit 12 and a control unit 13. The control unit 13 is electrically connected with the pixel retrieving unit 11 and the pixel storing unit 12. The pixel retrieving unit 11 obtains two sub-pixel values from at least two pixels of the original depth frame, respectively. The pixel storing unit 12 stores the two sub-pixel values into corresponding two sub-pixels of one pixel of the resized depth frame, respectively. Herein, the pixel retrieving unit 11 and the pixel storing unit 12 can be implemented by software, hardware or firmware, and this invention is not limited. The control unit 13 includes the core control assembly of the device 1 such as a CPU or the combination of any suitable hardware, software or firmware. The control unit 13 can control the pixel retrieving unit 11 to obtain the sub-pixel values of the original depth frame, and control the pixel storing unit 12 to store the sub-pixel values into corresponding sub-pixels of the resized depth frame. The above method and device 1 will be further described in detail with reference to FIGS. 3A to 3C.

Figure 3A:
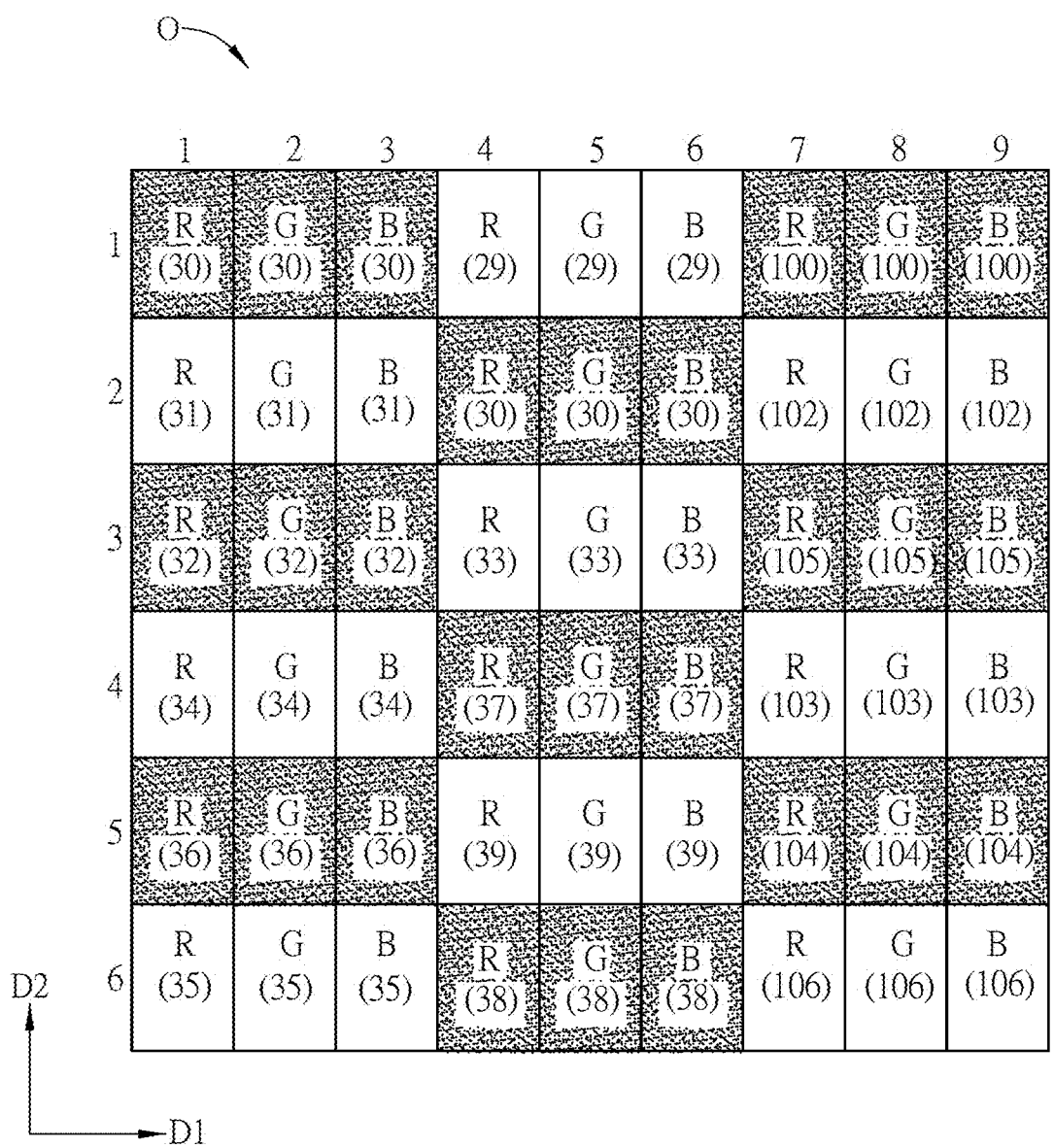
FIG. 3A is a schematic diagram showing an original depth frame according to the preferred embodiment of the invention.
Figure 3B:
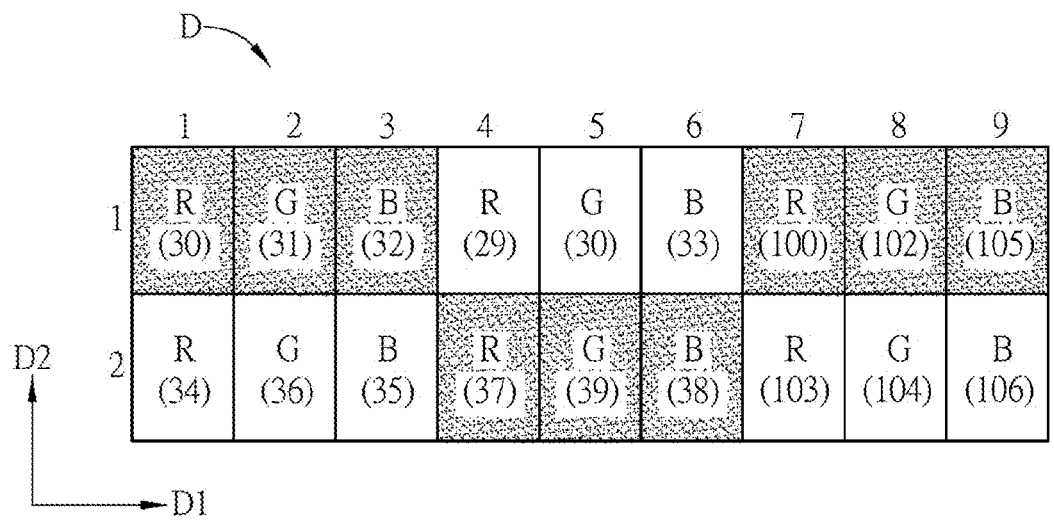
FIGS. 3B and 3C are schematic diagrams showing two resized depth frames, respectively, according to the preferred embodiment of the invention.

FIGS. 3A and 3B show the original depth frame O and a resized depth frame D, respectively. As described in FIG. 1, the original depth frame O is a gray-level frame, and each pixel has three sub-pixels including red, green and blue sub-pixels (R, G, B). Since the original depth frame O is a gray-level frame, the three sub-pixels in one pixel have the same sub-pixel value (gray-level value). Besides, each pixel of the resized depth frame D also has three sub-pixels. In this embodiment, the original depth frame O includes 3×6=18 pixels, so it totally includes 9×6=54 sub-pixels. The position and value of each sub-pixel will be represented by a corresponding code. For example, the sub-pixel at the first column and the first row of FIG. 3A is represented by R(30), which means this sub-pixel is a red sub-pixel (sub-pixel R) and the sub-pixel value thereof is 30, and the location of this sub-pixel is represented by (1,1). In addition, the sub-pixel at the fifth column and the third row is represented by G(33), which means this sub-pixel is a green sub-pixel (sub-pixel G) and the sub-pixel value thereof is 33, and the location of this sub-pixel is represented by (5,3).

In the embodiment, the method is to obtain three sub-pixel values from three pixels of the original depth frame O, respectively; by the pixel retrieving unit 11, and to store the sub-pixel values into corresponding three sub-pixels of a pixel of the resized depth frame D, respectively, by the pixel storing unit 12. As shown in FIGS. 3A and 3B, the sub-pixel value (30) is obtained from the position (1,1) (sub-pixel R) of the original depth frame O, and the retrieved sub-pixel value (30) is stored into the position (1,1) (sub-pixel R) of the resized depth frame D. To be noted, since the three sub-pixel values of one pixel of the original depth frame O are all the same, it is also acceptable to obtain the sub-pixel value from the position (2,1) (sub-pixel G) or the position (3,1) (sub-pixel B) of the original depth frame O. Similarly, the sub-pixel value (31) is obtained from the position (1,2) (sub-pixel R) of the original depth frame O, and the retrieved sub-pixel value (31) is stored into the position (2,1) (sub-pixel G) of the resized depth frame D. The sub-pixel value (32) is obtained from the position (1,3) (sub-pixel R) of the original depth frame O, and the retrieved sub-pixel value (32) is stored into the position (3,1) (sub-pixel B) of the resized depth frame D. The sub-pixel value (34) is obtained from the position (1,4) (sub-pixel R) of the original depth frame O, and the retrieved sub-pixel value (34) is stored into the position (1,2) (sub-pixel R) of the resized depth frame D. The sub-pixel value (36) is obtained from the position (1,5)

Figure 3C:
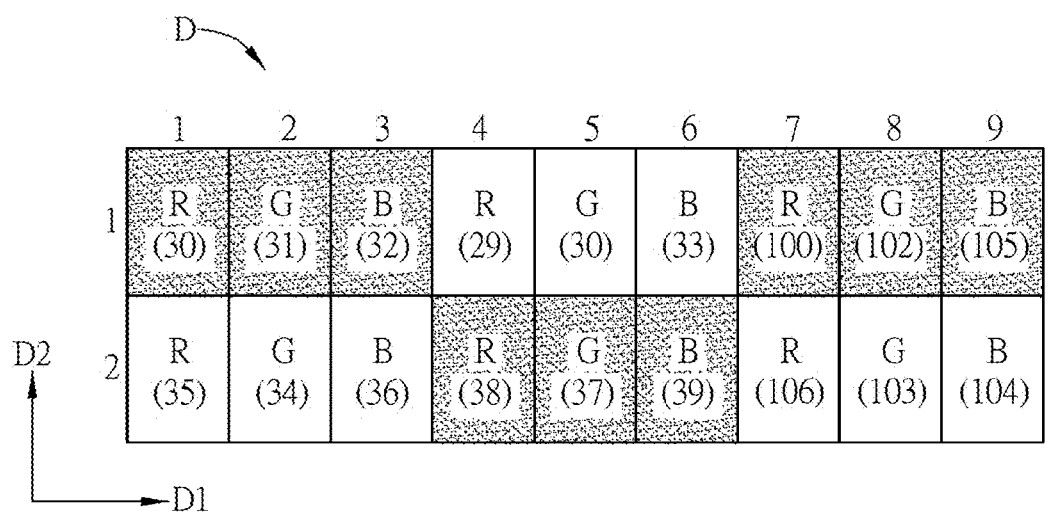

(sub-pixel R) of the original depth frame O, and the retrieved sub-pixel value (36) is stored into the position (2,2) (sub-pixel G) of the resized depth frame D. The sub-pixel value (35) is obtained from the position (1,6) (sub-pixel R) of the original depth frame O, and the retrieved sub-pixel value (35) is stored into the position (3,2) (sub-pixel B) of the resized depth frame D. The sub-pixel value (29) is obtained from the position (4,1) (sub-pixel R) of the original depth frame O, and the retrieved sub-pixel value (29) is stored into the position (1,2) (sub-pixel R) of the resized depth frame D. The sub-pixel value (30) is obtained from the position (4,2) (sub-pixel R) of the original depth frame O, and the retrieved sub-pixel value (30) is stored into the position (5,1) (sub-pixel G) of the resized depth frame D. The sub-pixel value (103) is obtained from the position (7,4) (sub-pixel R) of the original depth frame O, and the retrieved sub-pixel value (103) is stored into the position (7,2) (sub-pixel R) of the resized depth frame D. The sub-pixel value (104) is obtained from the position (7,5) (sub-pixel R) of the original depth frame O, and the retrieved sub-pixel value (104) is stored into the position (8,2) (sub-pixel G) of the resized depth frame D. The sub-pixel value (106) is obtained from the position (7,6) (sub-pixel R) of the original depth frame O, and the retrieved sub-pixel value (106) is stored into the position (9,2) (sub-pixel B) of the resized depth frame D. Accordingly, the size of the resized depth frame D is ⅓ of the original depth frame O along a column direction D2, and the size of the resized depth frame D is the same as the original depth frame O along a row direction D1. Thus, the data volume of the resized depth frame D is ⅓ of the original depth frame O. To be noted, the sequence of retrieving the sub-pixel values is for an illustration only. In other embodiments, the sequence of retrieving the sub-pixel values (or the relative position in the resized data) may be different for improving the accuracy of the resized data. For example, the first row of the data in FIG. 3C is the same as the first row of the data in FIG. 3B, but the second row of the data in FIG. 3C is the shift of the sub-pixel values of the second row of the data in FIG. 3B. Regarding to the second row in FIG. 3B, the sub-pixel value (34) of the position (2,1) is shifted rightward for one sub-pixel, the sub-pixel value (36) of the position (2,2) is shifted rightward for one sub-pixel, and the sub-pixel value (35) of the position (2,3) is shifted leftward for two sub-pixels, thereby forming the second row in FIG. 3C. The rearrangement or shift of the sub-pixel values is for an illustration only, and this invention is not limited thereto. Accordingly, the data in the resized depth frame can have different orders, so that the resized depth frame can still keep the accuracy.

Figure 4A:
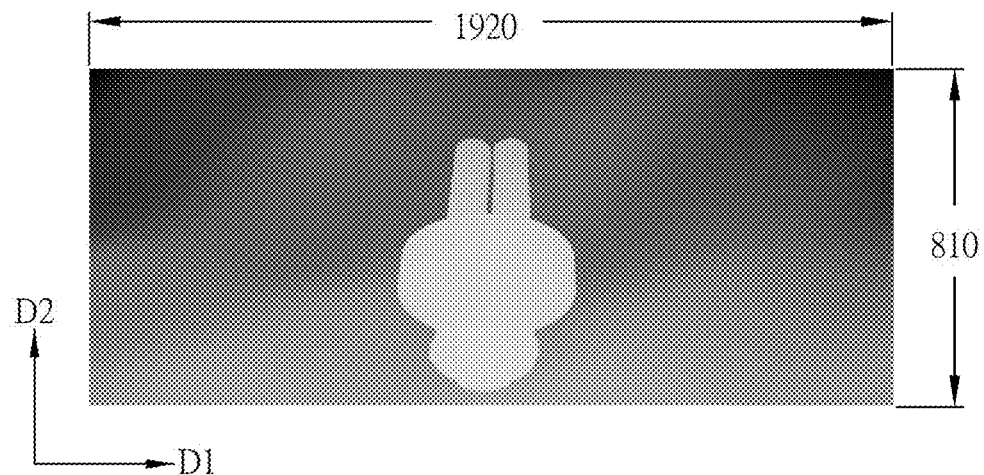
FIG. 4A is a schematic diagram showing the image of an original depth frame according to the preferred embodiment of the invention.
Figure 4B:
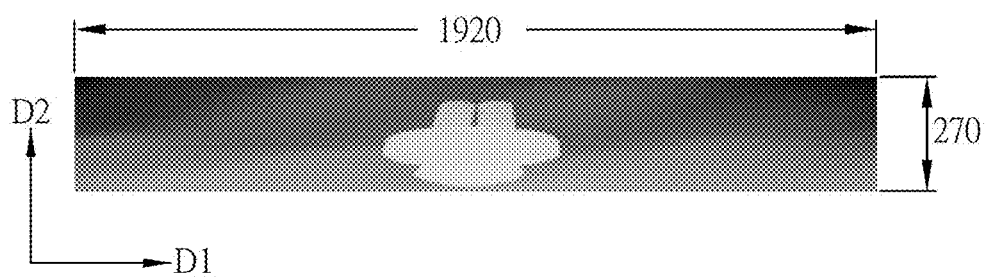
FIG. 4B is a schematic diagram showing the image of a resized depth frame (from the original depth frame of FIG. 4A) according to the preferred embodiment of the invention.
Figure 4C:
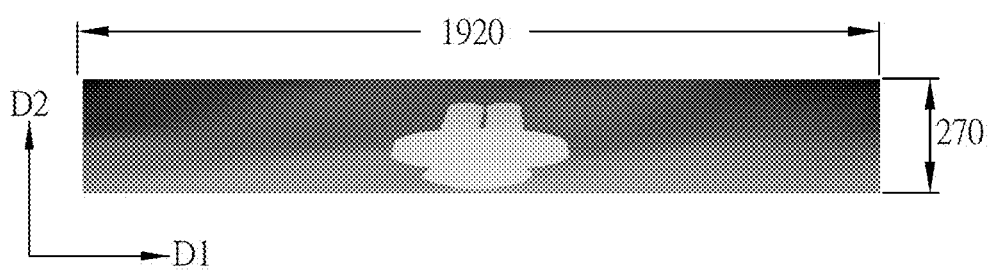
FIG. 4C is a schematic diagram showing the image of another resized depth frame (from the original depth frame of FIG. 4A) according to the preferred embodiment of the invention.

FIG. 4A is a schematic diagram showing the image of an original depth frame according to the preferred embodiment of the invention, and FIGS. 4B and 4C are schematic diagrams showing the images of resized depth frames (from the original depth frame of FIG. 4A) according to the preferred embodiment of the invention. Herein, FIG. 4B corresponds to FIG. 3B, and FIG. 4C corresponds to FIG. 3C. Although the resizing methods for FIGS. 4B and 4C are different, the shown images in FIGS. 4B and 4C are very close and seem the same as viewing by eyes. The size (resolution) of the gray-level frame in FIG. 4A is 1920×810, and the size (resolution) of the gray-level frame in FIGS. 4B and 4C is 1920×270 (wherein, 270=810×⅓). As a result, the size of the resized depth frame in FIGS. 4B and 4C is ⅓ of the original depth frame O in FIG. 4A. Therefore, the invention provides an effective depth frame compression technology, which has the advantages of higher compression efficiency, smaller data volume and higher transmission efficiency, so that it can effectively reduce the loadings of the bandwidth of the current transmission apparatus. In addition, since the sub-pixels values of the embodiment can be resized or shifted, the method for resizing an original depth frame into a resized depth frame can be applied with additional compression technology for performing a secondary frame compression, which can still keep the accuracy of the depth frame.

Figures 5B, 5C:
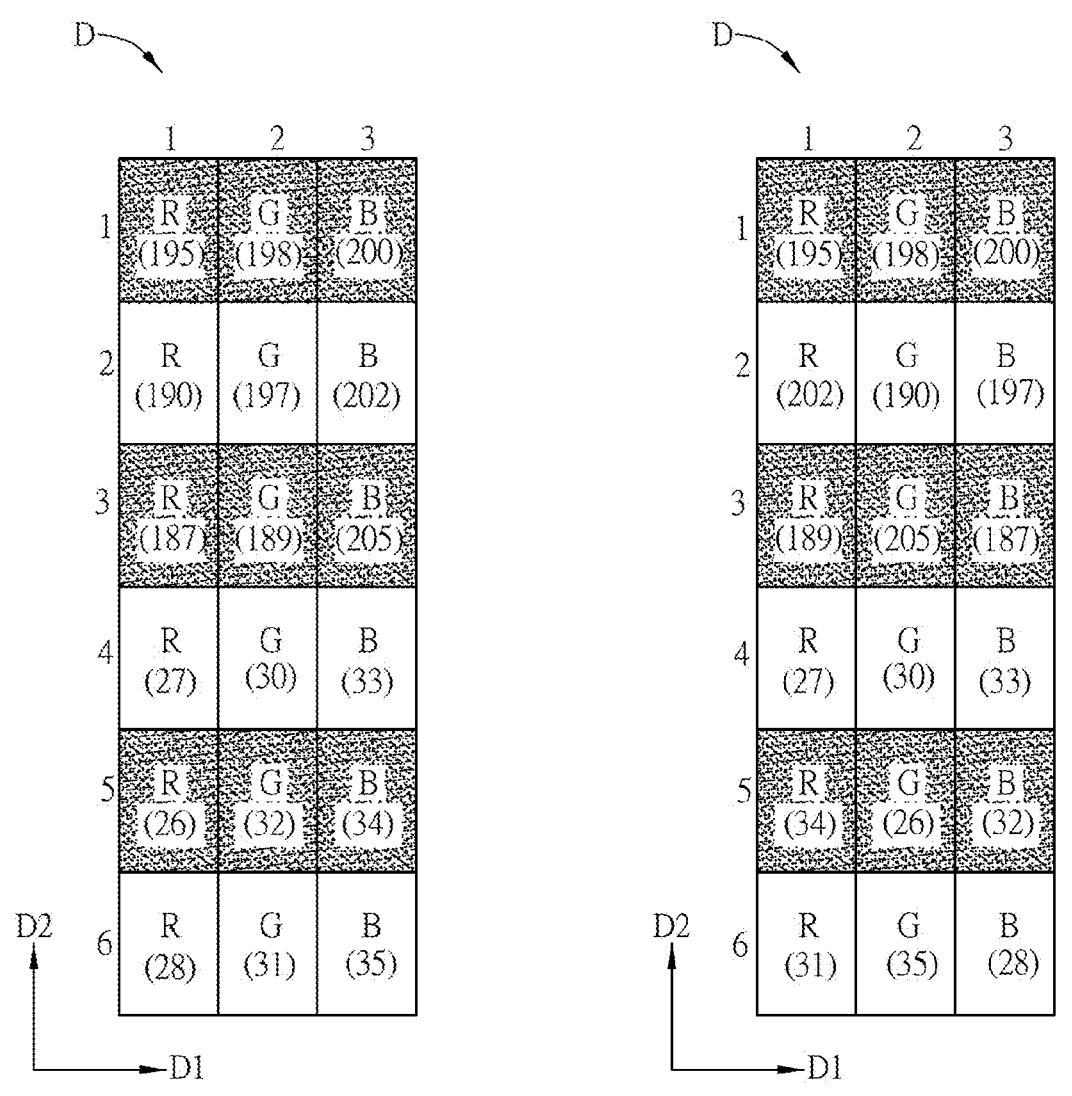

FIG. 5A is a schematic diagram showing another original depth frame O according to the preferred embodiment of the invention, and FIG. 5B is a schematic diagram showing a corresponding resized depth frame D. Herein, the original depth frame O is still a gray-level frame, each pixel of the original depth frame O also has three sub-pixels (R, G, B), and the three sub-pixel values (gray-level values) of one pixel are the same. In addition, each pixel of the resized depth frame D also has three sub-pixels. In this embodiment, the original depth frame O also includes 3×6=18 pixels, so it has 9×6=54 sub-pixels. The position and value of each sub-pixel will be represented by a corresponding code. For example, the sub-pixel at the first column and the first row of FIG. 5A is represented by R(195), which means this sub-pixel is a red sub-pixel (sub-pixel R) and the sub-pixel value thereof is 195, and the location of this sub-pixel is represented by (1,1). In addition, the sub-pixel at the third column and the fifth row is represented by B(26), which means this sub-pixel is a blue sub-pixel (sub-pixel B) and the sub-pixel value thereof is 26, and the location of this sub-pixel is represented by (3,5).

In the embodiment as shown in FIGS. 5A and 5B, the sub-pixel value (195) is obtained from the position (1,1) of the original depth frame O, and the retrieved sub-pixel value (195) is stored into the position (1,1) of the resized depth frame D. To be noted, since the three sub-pixel values of one pixel of the original depth frame O are all the same, it is also acceptable to obtain the sub-pixel value from the position (2,1) or the position (3,1) of the original depth frame O. Similarly, the sub-pixel value (198) is obtained from the position (4,1) of the original depth frame O, and the retrieved sub-pixel value (198) is stored into the position (2,1) of the resized depth frame D. The sub-pixel value (200) is obtained from the position (7,1) of the original depth frame O, and the retrieved sub-pixel value (200) is stored into the position (3,1) of the resized depth frame D. The sub-pixel value (190) is obtained from the position (1,2) of the original depth frame O, and the retrieved sub-pixel value (190) is stored into the position (1,2) of the resized depth frame D. The sub-pixel value (31) is obtained from the position (4,6) of the original depth frame O, and the retrieved sub-pixel value (31) is stored into the position (2,6) of the resized depth frame D. The sub-pixel value (35) is obtained from the position (7,6) of the original depth frame O, and the retrieved sub-pixel value (35) is stored into the position (3,6) of the resized depth frame D. Accordingly, the size of the resized depth frame D is ⅓ of the original depth frame O along a row direction D1, and the size of the resized depth frame D is the same as the original depth frame O along a column direction D2. Thus, the data volume of the resized depth frame D is ⅓ of the original depth frame O. To be noted, the sequence of retrieving the sub-pixel values is for an illustration only. In other embodiments, the sequence of retrieving the sub-pixel values (or the relative position in the resized data) may be different for improving the accuracy of the resized data. For example, the first row of the data in FIG. 5C is the same as the first row of the data in FIG. 5B, but the second row of the data in FIG. 5C is the shift of the sub-pixel values of the second row of the data in FIG. 5B.

Regarding to the second row in FIG. 5B, the sub-pixel values are shifted rightward for one sub-pixel. Regarding to the third row in FIG. 5B, the sub-pixel values are shifted rightward for two sub-pixels. In addition, the fourth row of the data in FIG. 5C is the same as the fourth row of the data in FIG. 5B. Regarding to the fifth row in FIG. 5B, the sub-pixel values are shifted rightward for one sub-pixel. Regarding to the sixth row in FIG. 5B, the sub-pixel values are shifted rightward for two sub-pixels. The rearrangement or shift of the sub-pixel values is for an illustration only, and this invention is not limited thereto.

FIG. 6A is a schematic diagram showing the image of another original depth frame according to the preferred embodiment of the invention, and FIGS. 6B and 6C are schematic diagrams showing the images of resized depth frames (from the original depth frame of FIG. 6A) according to the preferred embodiment of the invention. Although the resizing methods for FIGS. 6B and 6C are different, the shown images in FIGS. 6B and 6C are very close and seem the same as viewing by eyes. The size (resolution) of the gray-level frame in FIG. 6A is 1920×810, and the size (resolution) of the gray-level frame in FIGS. 6B and 6C is 630×810 (wherein, 630=1920×⅓). As a result, the size of the resized depth frame in FIGS. 6B and 6C is ⅓ of the original depth frame O in FIG. 6A.

To be noted, the discussed conditions, such as the size of the original depth frame O and the number of the sub-pixels (3 sub-pixels) in each pixel, are for illustrations only. Of course, in other embodiments, the size of the original depth frame O and/or the number of the sub-pixels in each pixel can be different, and this invention is not limited. For example, each pixel may include 2 or 4 sub-pixels.

Figure 7:
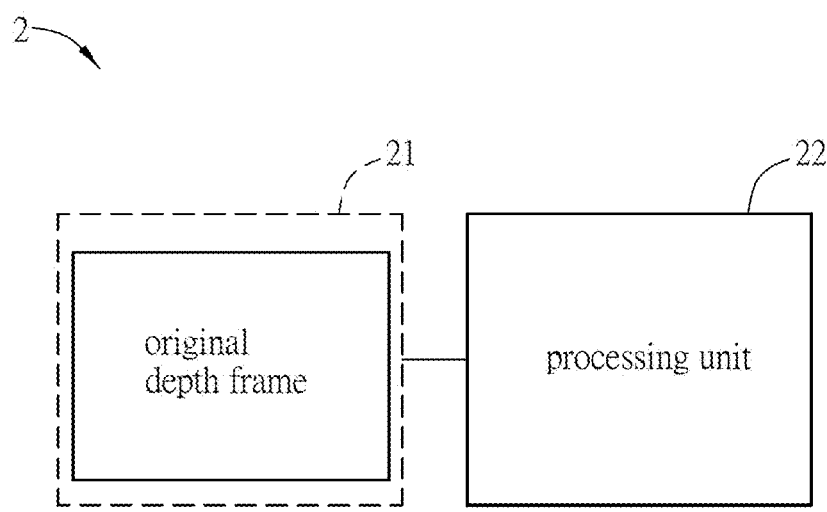
FIG. 7 is a block diagram showing a system for resizing an original depth frame into a resized depth frame according to a preferred embodiment of the invention.

FIG. 7 is a block diagram showing a system 2 for resizing an original depth frame into a resized depth frame according to a preferred embodiment of the invention.

The system 2 includes a memory unit 21 and a processing unit 22, which are electrically connected to each other. The memory unit 21 stores the original depth frame and, of course, the resized depth frame. The memory unit 21 can be a non-transitory computer readable storage medium, such as a memory, memory card, CD, tape, or any of their combinations, for storing the needed information. In this embodiment, the memory can be a ROM, RAM, flash memory, FPGA, and any usable memory, and this invention is not limited.

The processing unit 22 includes the core control assembly of the system 2, such as a CPU and a memory including any control hardware, software or firmware. In this embodiment, the processing unit 22 obtains two sub-pixel values from at least two pixels of the original depth frame, respectively, and stores the two sub-pixel values into corresponding two sub-pixels of one pixel of the resized depth frame, respectively. Furthermore, the size of the resized depth frame is ⅓ of the original depth frame along a column direction D2 or a row direction D1.

The technical features of the system 2 for resizing an original depth frame into a resized depth frame can be referred to the above method and device 1, so the detailed description thereof will be omitted.

In summary, the method for resizing an original depth frame into a resized depth frame is to obtain two sub-pixel values from at least two pixels of the original depth frame, respectively, and to store the two sub-pixel values into corresponding two sub-pixels of a pixel of the resized depth frame, respectively. Accordingly, the data volume of the resized depth frame can be at least minimized to about ½ of the original depth frame or smaller (e.g. ⅓ of the original depth frame), thereby providing an effective compression technology for depth frames. The method, device and system of the invention have the advantages of higher compression efficiency, smaller data volume and higher transmission efficiency, so that it can effectively reduce the loadings of the bandwidth of the current transmission apparatus.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for resizing an original depth frame into a resized depth frame, comprising steps of:
    retrieving one sub-pixel value from each of pixels of the original depth frame to obtain a plurality of retrieved sub-pixel values, wherein the sub-pixel values of the same pixel of the original depth frame are the same; and
    storing the three retrieved sub-pixel values into three sub-pixels of one pixel of the resized depth frame, respectively.

2. The method of claim 1, wherein the original depth frame is a gray-level frame, and the sub-pixel values of each pixel of the gray-level frame are the same.

3. The method of claim 1, wherein the size of the resized depth frame is ⅓ of the original depth frame along a column direction.

4. The method of claim 1, wherein the size of the resized depth frame is ⅓ of the original depth frame along a row direction.

5. A device for resizing an original depth frame into a resized depth frame, comprising:
    a pixel retrieving unit for retrieving one sub-pixel value from each of pixels of the original depth frame to obtain a plurality of retrieved sub-pixel values, wherein the sub-pixel values of the same pixel of the original depth frame are the same; and
    a pixel storing unit for storing the three retrieved sub-pixel values into three sub-pixels of one pixel of the resized depth frame, respectively.

6. The device of claim 5, wherein the original depth frame is a gray-level frame, and the sub-pixel values of each pixel of the gray-level frame are the same.

7. The device of claim 5, wherein the size of the resized depth frame is ⅓ of the original depth frame along a column direction.

8. The device of claim 5, wherein the size of the resized depth frame is ⅓ of the original depth frame along a row direction.

9. A system for resizing an original depth frame into a resized depth frame, comprising:
    a memory unit for storing the original depth frame; and
    a processing unit for retrieving one sub-pixel value from each of pixels of the original depth frame to obtain a plurality of retrieved sub-pixel values and storing the three retrieved sub-pixel values into three sub-pixels of one pixel of the resized depth frame, respectively, wherein the sub-pixel values of the same pixel of the original depth frame are the same.

10. The system of claim 9, wherein the original depth frame is a gray-level frame, and the sub-pixel values of each pixel of the gray-level frame are the same.

11. The system of claim 9, wherein the size of the resized depth frame is ⅓ of the original depth frame along a column direction.

12. The system of claim 9, wherein the size of the resized depth frame is ⅓ of the original depth frame along a row direction.

* * * * *